(12) United States Patent  (10) Patent No.: US 9,018,797 B2
Cochran et al.  (45) Date of Patent: Apr. 28, 2015

(54) POWER DISTRIBUTION MANAGEMENT

(75) Inventors: Charles W. Cochran, Spring, TX (US); Thomas Edwin Turicchi, Jr., Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 992 days.

(21) Appl. No.: 12/790,514

(22) Filed: May 28, 2010

(65) Prior Publication Data

US 2011/0291478 A1 Dec. 1, 2011

(51) Int. Cl.
*H02J 3/00* (2006.01)
*H02J 3/46* (2006.01)
*H02J 1/10* (2006.01)
*G06F 1/26* (2006.01)

(52) U.S. Cl.
CPC . *H02J 1/10* (2013.01); *G06F 1/266* (2013.01); *G06F 2200/261* (2013.01)

(58) Field of Classification Search
USPC ................................................ 307/24, 29
See application file for complete search history.

(56) References Cited

U.S. PATENT DOCUMENTS

| 7,194,445 | B2 * | 3/2007 | Chan et al. ............... 706/20 |
| 2004/0199342 | A1 * | 10/2004 | Graves et al. ............... 702/60 |
| 2004/0236843 | A1 * | 11/2004 | Wing et al. ............... 709/219 |
| 2009/0217073 | A1 * | 8/2009 | Brech et al. ............... 713/340 |
| 2009/0307514 | A1 * | 12/2009 | Roberts et al. ............... 713/330 |
| 2010/0198535 | A1 * | 8/2010 | Brown et al. ............... 702/62 |
| 2011/0012427 | A1 * | 1/2011 | Craig et al. ............... 307/29 |

* cited by examiner

*Primary Examiner* — Rexford Barnie
*Assistant Examiner* — Dru Parries
(74) *Attorney, Agent, or Firm* — Van Cott, Bagley, Cornwall & McCarthy, P.C.

(57) ABSTRACT

A method for power distribution management includes receiving data specifying a group of Power Distribution Units (PDUs) from which an electronic device powered by at least one of the group of PDUs draws power; and automatically determining whether the electronic device is redundantly powered.

11 Claims, 5 Drawing Sheets

POWER DISTRIBUTION MANAGEMENT

BACKGROUND

Power Distribution Units (PDUs) are commonly employed to distribute power to electronic devices. One environment in which PDUs are commonly used is a datacenter. A datacenter is a facility used to house electronic devices such as computing systems. These computing systems may be used for storage, application processing, and network traffic routing purposes. It is important that such systems be provided with an uninterrupted supply of power. PDUs draw power from a power source and then supply that power to the power supply units of a number of electronic devices. A power supply unit within an electronic device typically draws power of a particular voltage from a PDU and transforms that power into a form that is readily usable by the electronic circuitry of that electronic device.

Many large scale electronic devices such as the computing systems typically used in a datacenter include many power supply units, each power supply unit collecting power from a different electrical outlet. These different electrical outlets may or may not be on the same PDU. Having electronic devices draw power from multiple PDUs allows the electronic devices to be redundantly powered. For example, a particular electronic device may be drawing power from at least two different PDUs, each PDU receiving power from a different power feed. Such a structure allows the electronic device to still draw power in the event that one power feed to the datacenter is disrupted.

As the environments in which PDUs operate become more complicated, power distribution network structures also become increasingly complex. In the process of setting up the power distribution network or expanding it, human error may leave some electronic devices without a fully redundant power supply. Additionally, the power load balance across the multiple PDUs supplying power to a particular electronic device may cause the power distribution network to operate at less than optimal efficiency.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
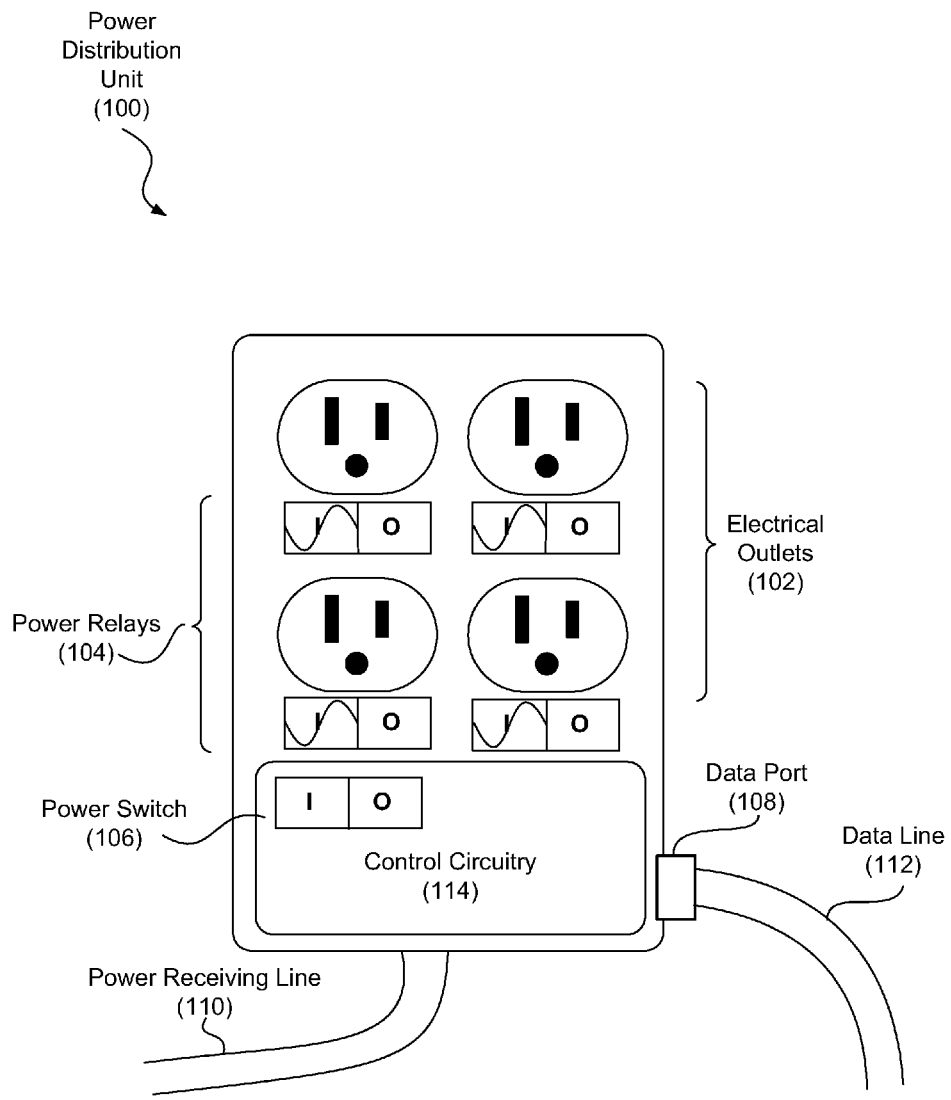
FIG. 1 is a diagram showing an illustrative PDU, according to one example of principles described herein.

As mentioned above, as the environments in which PDUs operate become more complicated, power distribution network structures also become increasingly complex. In the process of setting up the power distribution network or expanding it, human error may leave some electronic devices without a fully redundant power supply. Additionally, the power load balance across the multiple PDUs may cause the power distribution network to operate at less than optimal efficiency.

In light of these and other issues, the present specification relates to methods and systems for managing a power distribution network. Particularly, methods and systems in which PDUs coordinate power management of electronic devices and are able to automatically detect and report redundancy errors within a power distribution network.

According to certain illustrative examples, the PDUs within the power distribution network include a data network address. Thus, the PDUs themselves may communicate with the electronic devices they power as well as other PDUs to share information. Each PDU can be made aware of the other PDUs powering the electronic devices which that PDU powers. This may be done through a variety of means which will be described in detail below. With each PDU being aware of the other PDUs powering the electronic devices also powered by that PDU, the PDUs can automatically coordinate the management of power supply to the electronic devices they power. For example, if redundancy errors are detected, the PDUs may alert a system administrator. Additionally, the PDUs may alert a system administrator if a load imbalance of power supplied to a particular electronic device is detected.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "electronic device" is to be broadly interpreted as any computing system or electronic component which operates on electrical power. Electronic devices may include, but are not limited to, server systems, routings systems, and data storage systems.

Throughout this specification and in the appended claims, the term "Power Distribution Unit" or "PDU" is to be broadly interpreted as a device which draws power from a power source and provides that power to one or more electronic or power consuming devices.

The term "redundancy error" refers to the condition in which an electronic device is not redundantly powered. This means that the electronic device is ultimately connected to only one of multiple available power sources. A redundancy error should be corrected by connected the electronic device in question to at least a second power source, typically through a different PDU.

Referring now to the figures, FIG. 1 is a diagram showing an illustrative PDU (100). According to certain illustrative examples, a PDU (100) may include a number of electrical outlets (102), a number of electrical relays (104), a power switch (106), a power receiving line (110), control circuitry (114), and a data port (108) connected to a data line (112).

A PDU typically works by receiving power on a power receiving line (110) and distributing that power through a number of electrical outlets (102). Depending on the sophistication of the design, a PDU (100) may be configured to draw power in multiple phases and distribute each phase individually.

A PDU typically includes a manual power switch (106) allowing a user to switch power to the electrical outlets (102) on or off by operating the power switch (106). In some PDUs, the power switch (106) may act as a circuit breaker. The circuit breaker may be configured to cut power to the electrical outlets (102) in the event of a power spike in the receiving line (110). Thus, the devices being supplied power through the electrical outlets (102) are protected from damage due to such power spikes. A relay (104) associated with each electrical outlet (102) may also be used to individually cut power to a particular electrical outlet (102) without cutting power to the remaining electrical outlets (102).

Some PDUs (100) may include control circuitry (114) for various power management purposes. The control circuitry (114) may also be configured to transmit and receive data to an external entity. This data may be transferred to the external entity through a data line (112) connected to a data port (108) of the PDU (100). The data port may be assigned physical and logical network address in accordance with the network protocols employed by the environment in which the PDU (100) operates. In some embodiments, the control circuitry (114) may include a transceiver for wirelessly transmitting or receiving data without using a physical data port (108) and data line (112).

Figure 2:
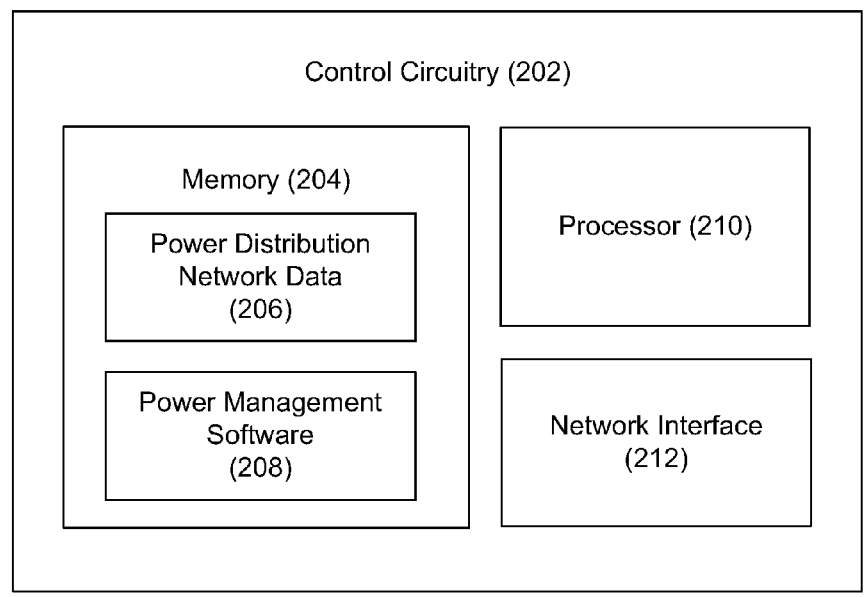
FIG. 2 is a diagram showing illustrative the components of control circuitry for a PDU, according to one example of principles described herein.

FIG. 2 is a diagram showing illustrative control circuitry (202) of a PDU (200). According to certain illustrative examples, control circuitry (202) includes a memory (204) having power distribution network data (206) and power management software (208) stored thereon, a processor (210), a network interface (212), and a number of power distribution components (214).

There are many types of memory (204) available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of data and software.

Software generally includes a set of instructions which are stored in memory and in a format able to be executed by a processor (210). One type of software which may be stored in memory (204) is power management software (208). The power management software (208) may instruct the processor (210) to interact with the hardware of the PDU (202) and perform the appropriate tasks. The hardware controlled by the processor (210) may include a number of power distribution components configured to modify and distribute power appropriately.

The power management software (208) may also be configured to collect power distribution network data (206) and store it in memory (204). Power distribution network data (206) may include information including, but not limited to, network addresses of other PDUs, network addresses of devices powered by the power distribution network, and mapping of electrical outlets to devices. Additionally, the power distribution network data may include power usage statistics for each electrical outlet of the PDU (200).

The network interface (212) allows the control circuitry (202) of the PDU (200) to communicate with other devices over a data network. These other devices may include, but are not limited to, other PDUs, electronic devices such as computing systems, and a central management system.

Figure 3:
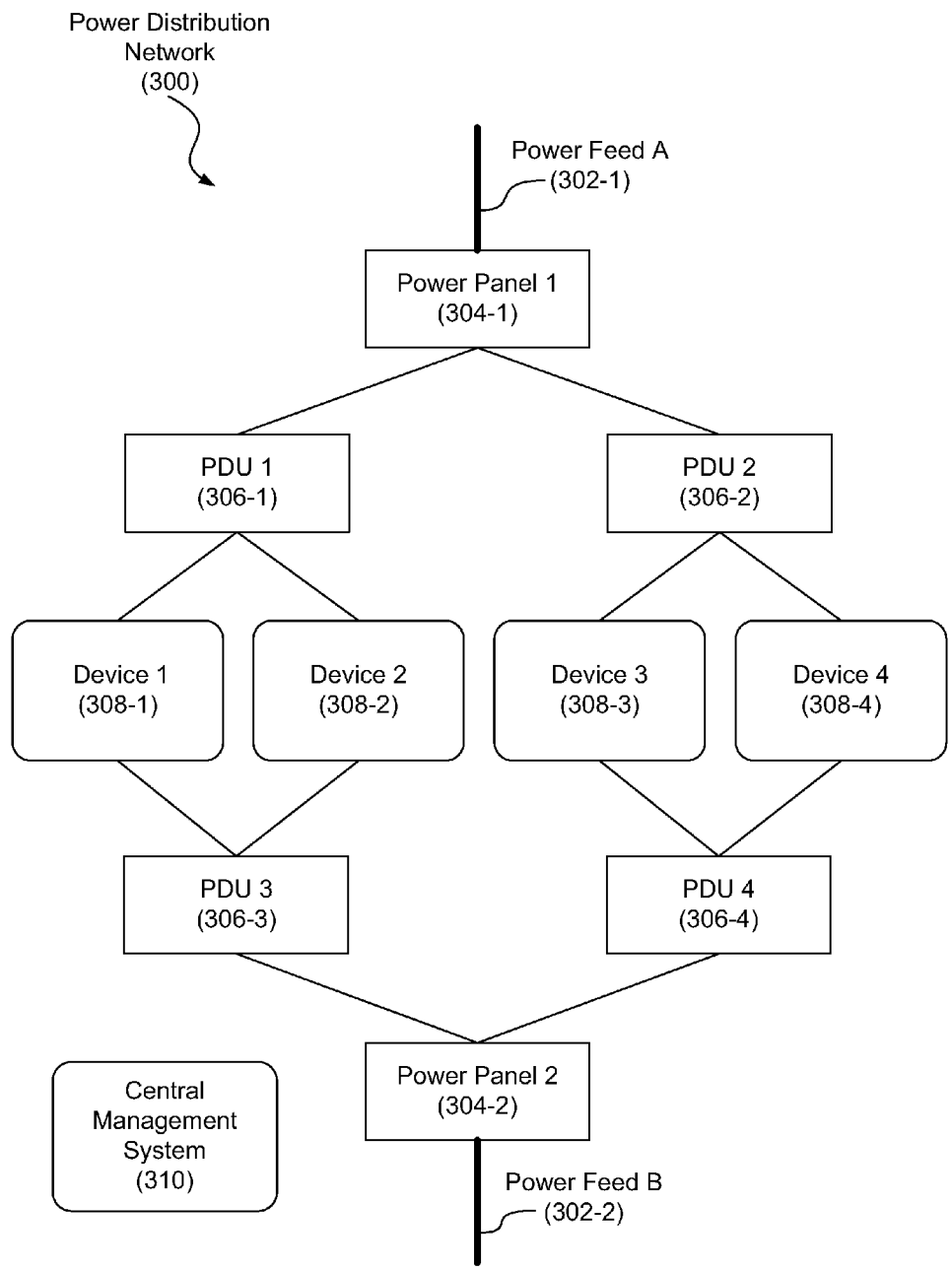
FIG. 3 is a diagram showing an illustrative power distribution network including a number of PDUs, according to one example of principles described herein.

FIG. 3 is a diagram showing an illustrative power distribution network (300) including a number of PDUs (302). According to certain illustrative examples, a number of electronic devices (308) draw power from a number of PDUs (306). Those PDUs draw power from a power panel (304). A power panel (304) draws power from a power feed (302).

As mentioned above, the power distribution network (300) of a datacenter is typically structured to redundantly supply power to the electronic devices (308) within the datacenter. To redundantly power to an electronic device (308), the electronic device (308) is set up to draw power from more than one PDU (306). Ideally, the electronic device (308) will be connected to at least one PDU (306) which ultimately draws power from a first power feed (302-1) and at least one PDU (306) which ultimately draws power from a second power feed (302-2).

In the example illustrated in FIG. 3, electronic device 1 (308-1) and electronic device 2 (308-2) draw power from both PDU 1 (306-1) and PDU 3 (306-3). PDU 1 (306-1) draws power from power panel 1 (304-1) which draws power from power feed A (302-1). PDU 3 (306-3) draws power from power panel 2 (304-2) which draws power from power feed B (302-2). Thus, if power feed A were to be disrupted for some reason, electronic devices 1 and 2 (308-1, 308-2) would still be able to draw power from power feed B (302-2) through power panel 2 (304-2) and PDU 3 (306-3).

Similarly, electronic device 3 (308-3) and electronic device 4 (308-4) draw power from both PDU 2 (306-2) and PDU 4 (306-4). PDU 2 (306-2) draws power from power panel 1 (304-1) which draws power from power feed A (302-1). PDU 4 (306-4) draws power from power panel 2 (304-2) which draws power from power feed B (302-2). Thus, each electronic device (308) within the power distribution network (300) is redundantly powered.

Although not shown in FIG. 3, the electronic devices (308), PDUs (306) and central management system (310) may be interconnected through a data network. The data network allows the electronic devices (308), PDUs (306), and central management to share data with each other. Particularly, data related to the management of power supplied to the electronic devices (308) can be shared to ensure that each device is redundantly powered.

As mentioned above, PDUs may record usage data for each of their outlets. In some examples, this data may be transmitted to a central management system (310). The central management system (310) is responsible for monitoring the power distribution network (300). The central management system (310) may communicate with and provide instructions to each device within the power distribution network, including the PDUs and the electronic devices being powered.

The central management system (310) may automatically determine which electronic devices are receiving power from which PDUs. This may be done by correlating the usage data recorded by the PDUs to the load data recorded by the electronic devices. Electronic devices vary in the amount of power they draw over time. The processing load experienced by these electronic devices creates a unique signature. This load data may be compared to the usage data recorded by each PDU. A central management system (310) or other physical computing system can then match the usage data for each outlet of each PDU with the load data of each electronic device to accurately determine which electronic devices are plugged into which PDU. This method allows for an automatic way of matching electronic devices with the PDUs to which they are connected. This automatic method is not prone to the human error that is present with manual methods of matching PDUs to electronic devices.

In some cases an electronic device may be aware of the PDUs from which it draws power by having the power cords supplying power from the PDUs to the electronic devices include a data line or other means of direct communication such as power line data carrier. For example, the power cord may include the main wires used for transmitting power as well as a wire which may be designed to transfer data between the PDU and the electronic device. This data may include an identification number of the PDU, thus allowing the electronic device to be aware of the PDU(s) from which it draws power. Additionally, the power cord may be configured to transmit data along the same wire which transmits the power. This may be done using a carrier signal transmitted through the wire along with the power signal.

As mentioned above, the PDUs themselves may communicate with the electronic devices they power as well as other PDUs to share information. Each PDU can query the electronic devices to which they supply power. In response to a query, an electronic device may provide the PDU initiating the query with power supply data. The power supply data includes a list of all the other PDUs from which the electronic device draws power. With each PDU being aware of the other PDUs which power the electronic devices which that PDU powers, the PDUs will be able to detect redundancy errors and perform other useful management functions.

Either or both of the central management system (310) or the PDUs (306) themselves may be programmed to determine when an electronic device is not redundantly powered, i.e., ultimately drawings power from different power feeds (302). The central management system (301) or PDU (306) may then issue an alert that one or more of the supported electronic devices (308) is not redundantly powered. This alert may take any of a variety of forms including, a displayed warning at the central management system (310) or PDU (306); an email, text, instant messaging or other electronic message to one or more system administrators; an audible alarm; a warning light; etc.

Figure 4:
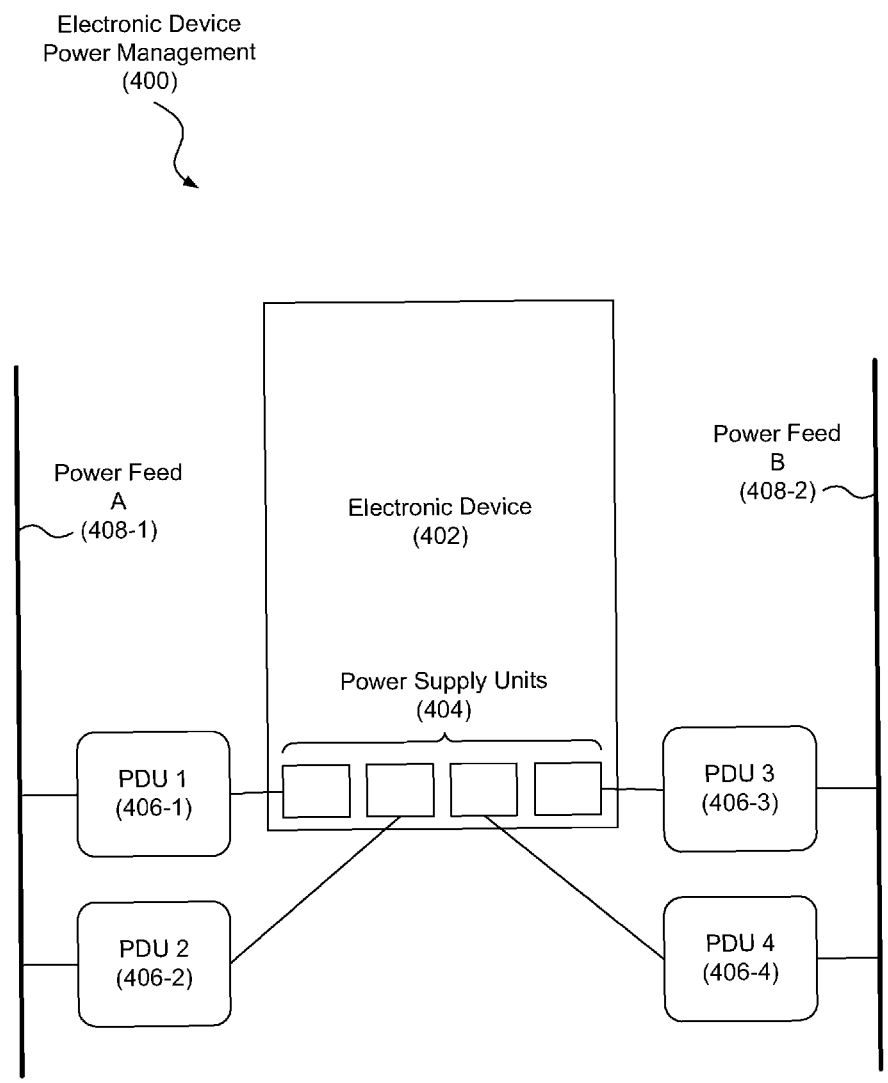
FIG. 4 is a diagram showing illustrative electronic device power management, according to one example of principles described herein.

FIG. 4 is a diagram showing illustrative electronic device power management. According to certain illustrative examples, an electronic device (402) may include a number of power supply units (404). Each power supply unit (404) draws power from a different PDU (406). Each PDU ultimately draws power from one of a number of power feed (408).

In one illustrative example, PDU 1 (406-1) queries the electronic device (402) to request power supply data from the electronic device (402). The electronic device (402), being aware of all PDUs from which it draws power, then sends PDU 1 (406-1) the requested power supply data. This power supply data informs PDU-1 (406-1) that PDU 2 (406-2), PDU 3 (406-3), and PDU 4 (406-4) are also supplying power to the electronic device (402). PDU 1 (406-1) may then communicate with the other PDUs to coordinate the management of power to the electronic device (402).

In one example, a PDU 1 (406-1) receives manual entry of the power supply data. For example, a network administrator may interface with PDU 1 (406-1) through its data port and provide the PDU (406-1) with the power supply data relating to which other PDUs (406-2, 406-3, 406-4) are powering the electronic device (402). In one example, PDU 1 (406-1) queries a central management system (e.g. 310, FIG. 3) to receive the power supply data.

The coordinated management between the PDUs (406) of the power supplied to the electronic device (402) provides several benefits. For example, the PDUs will be able to detect redundancy errors. If it were the case that the electronic device (402) is only receiving power from PDU-1 (406-1) and PDU 2 (406-2), those PDUs will determine that the electronic device is only receiving power from power feed A. Thus, the electronic device would not be redundantly powered. The PDU may then alert a central management system (e.g. 310, FIG. 3). The central management system may then inform an administrator of the redundancy error as described above. The administrator may then take corrective action to ensure that the electronic device (402) is redundantly powered.

The coordinated management between the PDUs (406) of the power supplied to the electronic device (402) also allows the PDUs (406) to manage the load balancing. For example, if the PDUs determine that the electronic device is drawing more power from PDU-3, then the PDUs may alert a central management system (310, FIG. 3). The central management system may then instruct the electronic device (402) to readjust which PDU's it draws power from if the electronic device (402) is equipped with such a function. Additionally or alternatively, the central management system may alert an administrator. The administrator may manually make some changes as to PDUs from which the electronic device draws power. Effective load balancing of power supplied to electronic devices within a power distribution network may increase the overall power efficiency.

In some cases, the coordinated management of power supplied to an electronic device (402) allows easy shutdown of the electronic device. For example, if an administrator wishes to shut down an electronic device (402) for maintenance or to perform a system reboot, the PDUs (406) managing the power to that device (402) may all cut power to the electronic device (402) when instructed to do so by the administrator. This allows the administrator to shut down the electronic device (402) in one single action instead of instructing each individual PDU (406) to cut power or manually disconnecting the power cord to each PDU (406).

The PDUs (406) may coordinate the management of power through a number of means. As mentioned above, each PDU (406) is connected to the data network and can transmit data over the network using standard network protocols. In some cases, the data transferred between the PDUs may be in a Remote Insight Board Command Language (RIBCL). RIBCL is a type of eXtensible Markup Language (XML). The use of RIBCL will allow developers to create a system in which data may be easily transmitted between devices (406) in a standard format.

Figure 5:
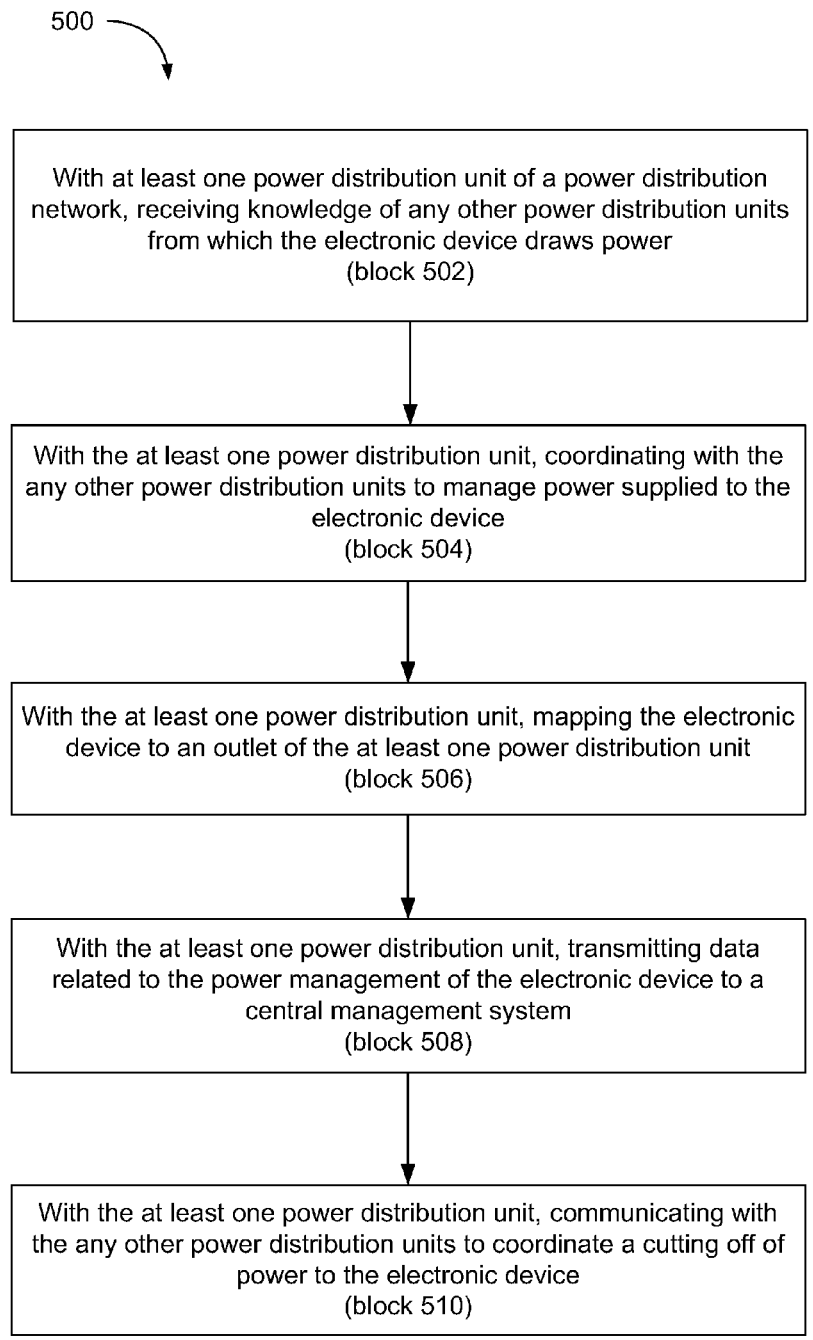
FIG. 5 is a flowchart showing an illustrative method for managing a power distribution network, according to one example of principles described herein.

FIG. 5 is a flowchart showing an illustrative method (500) for managing a power distribution network. According to certain illustrative examples, the method (500) may include, with at least one PDU of a power distribution network, receiving (block 502) data specifying any other PDUs from which the electronic device draws power; and with the at least one PDU, coordinating (block 504) with the any other PDUs to manage power supplied to the electronic device. The method may further include, with at least one PDU, mapping (block 506) the electronic device to an outlet of the at least one PDU; with at least one PDU, transmitting (block 508) data related to the power management of the electronic device to a central management system; and with at least one PDU, communicating (block 510) with any other PDUs to coordinate a cutting off of power to the electronic device.

In sum, through use of systems and methods embodying principles described herein, the PDUs powering an electronic device will be able to more effectively manage the power supplied to the electronic device. Particularly, the PDUs will be able to detect redundancy errors, load imbalances, and other power distribution network related issues. These errors and issues may then be reported to a system administrator who may then take corrective action.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for power distribution management, the method comprising:
with a central management system:
querying electronic devices powered by a power distribution network;
receiving data specifying a group of Power Distribution Units (PDUs) from which an electronic device powered by at least one of said group of PDUs draws power; and
with the PDUs:
automatically determining whether said electronic device is redundantly powered; and
automatically detect load imbalances of power supplied to said electronic devices powered by said power distribution network,
in which each of the PDUs communicates information to other PDUs in said group of PDUs regarding the PDUs from which said electronic device draws power to coordinate power management functions.

2. The method of claim 1, in which receiving said data and automatically determining whether said electronic device is redundantly powered is performed by at least one of: a PDU of said group of PDUs and a central management system.

3. The method of claim 1, in which said data specifying said group of PDUs from which said electronic device draws power is received through manual entry.

4. The method of claim 1, in which data specifying said group of PDUs from which said electronic device draws power is received automatically by querying an entity comprising one of: said electronic device and said central management system.

5. The method of claim 4, in which said entity obtains said data by matching power usage data of PDUs of said power distribution network to load data of electronic devices being provided with power from said power distribution network.

6. The method of claim 4, in which said entity obtains said data through a data cord associated with a power cord supplying power from at least one of said group of PDUs to said electronic device.

7. The method of claim 4, in which said entity obtains said data through a power line carrier signal on a power cord supplying power from at least one of said group of PDUs to said electronic device.

8. The method of claim 1, in which outlet level mapping data of said group of PDUs from which said electronic device draws power is received through querying at least one of: said electronic device and one of said group of PDUs.

9. The method of claim 1, further comprising, with one of said group of PDUs, transmitting data related to said power management of said electronic device to said central management system.

10. The method of claim 1, further comprising, with one of said group of PDUs, communicating with said group of PDUs to coordinate a cutting off of power to said electronic device.

11. A power distribution network comprising:
a number of Power Distribution Units (PDUs) supplying power to a number of electronic devices; and
a central management system;
in which said central management system:
queries electronic devices powered by said power distribution network;
receives from said electronic devices, data specifying a group of PDUs supplying power to that electronic device; and
in which the PDUs:
automatically determine whether said electronic device is redundantly powered;
automatically detect load imbalances of power supplied to said electronic devices powered by said power distribution network, and
communicate information to other PDUs in a group of PDUs regarding the PDUs from which said electronic device draws power to coordinate power management functions.

* * * * *